United States Patent
Kubota et al.

(10) Patent No.: US 11,659,833 B2
(45) Date of Patent: May 30, 2023

(54) COMPOSITION FOR CRYOPRESERVATION OF BOVINE REPRODUCTIVE CELLS AND CRYOPRESERVATION METHOD THEREOF

(71) Applicant: BioVerde Inc., Kyoto (JP)

(72) Inventors: Chikara Kubota, Kagoshima (JP); Takaaki Ando, Kagoshima (JP); Suong-Hyu Hyon, Uji (JP); Woogi Hyon, Kyoto (JP); Shuji Imamura, Aira (JP); Satoru Gessei, Kanoya (JP)

(73) Assignee: BioVerde Inc., Kyoto (JP)

( * ) Notice: Subject to any disclaimer, the term of this patent is extended or adjusted under 35 U.S.C. 154(b) by 713 days.

(21) Appl. No.: 16/326,978

(22) PCT Filed: Aug. 22, 2017

(86) PCT No.: PCT/JP2017/029979
§ 371 (c)(1),
(2) Date: Feb. 21, 2019

(87) PCT Pub. No.: WO2018/038115
PCT Pub. Date: Mar. 1, 2018

(65) Prior Publication Data
US 2019/0174742 A1     Jun. 13, 2019

(30) Foreign Application Priority Data
Aug. 22, 2016   (JP) .............................. JP2016-162212

(51) Int. Cl.
*A01N 1/02* (2006.01)

(52) U.S. Cl.
CPC ............. *A01N 1/0221* (2013.01); *A01N 1/02* (2013.01); *A01N 1/0226* (2013.01); *A01N 1/0231* (2013.01); *A01N 1/0284* (2013.01)

(58) Field of Classification Search
None
See application file for complete search history.

(56) References Cited

U.S. PATENT DOCUMENTS

| | | |
|---|---|---|
| 2002/0115054 A1 | 8/2002 | Forest et al. |
| 2006/0134783 A1 | 6/2006 | Fong et al. |
| 2011/0172315 A1 | 7/2011 | Matsumura et al. |
| 2013/0267771 A1 | 10/2013 | Uchiyama et al. |
| 2018/0042220 A1* | 2/2018 | Miyagawa ........... A01N 1/0268 |

FOREIGN PATENT DOCUMENTS

| | | |
|---|---|---|
| CN | 102986653 | 3/2013 |
| JP | 2011-030557 | 2/2011 |
| WO | 2009157209 | 12/2009 |
| WO | 2012074060 | 6/2012 |

OTHER PUBLICATIONS

Shibao et al. "The effect of a novel cryoprotective agent, carboxylated ε-poly-l-lysine, on the developmental ability of re-vitrified mouse embryos at the pronuclear stage." Cryobiology 68.2 (2014): 200-204. (Year: 2014).*
Papa et al. "Effect of glycerol on the viability and fertility of cooled bovine semen." Theriogenology 83.1 (2015): 107-113 (Year: 2015).*
International Search Report and Written Opinion for International Application No. PCT/JP2017/029979 dated Oct. 10, 2017, 10 pgs.
International Preliminary Report on Patentability for International Application No. PCT/JP2017/029979 dated Feb. 28, 2019, 6 pgs.
Extended European Search Report for European Patent Application No. 17843593.9 dated Apr. 2, 2020.
Matsumura, et al. "Polyampholytes as Cryoprotective Agents for Mammalian Cell Cryopreservation", Cell Transplantation, vol. 19, No. 6-7, Jun. 1, 2010, pp. 691-699, XP55676643.
Chinese Office Action for Chinese Patent Application No. 201780051137.1 dated Dec. 28, 2020.
Chinese Office Action for Chinese Patent Application No. 201780051137.1 dated Nov. 15, 2021.
Ha, et al. "52 Effect of Carboxylated Poly-l-lysine on the Post-Thaw Viability of In Vitro-Produced Bovine Blastocyst", Reproduction, Fertility and Development 27(1) 119-119 https://doi.org/10.1071/RDv27n1Ab52, Published Dec. 4, 2014, abstract only.
Bo, et al. "Evaluation and classification of bovine embryos" Anim. Reprod., v.10, n.3, p. 344-348, Jul./Sep. 2013.

* cited by examiner

*Primary Examiner* — Emily A Cordas
(74) *Attorney, Agent, or Firm* — Amin, Turocy & Watson, LLP

(57) ABSTRACT

Provided are a vehicle body assembling method and a vehicle body assembling apparatus which allow a simple configuration in the vicinity of the connecting portion between an upper jig and a lower jig and allow an increase in the efficiency of assembling work (welding work). A vehicle body assembling apparatus is equipped with a jig for supporting vehicle body components in a preassembled position, the jig comprising an upper jig and a lower jig which are connected to each other in at least two places. Each of the connection places is provided with a connecting means for fixing a three-dimensional coordinate position while allowing uniaxial turning. The vehicle body assembling apparatus is also equipped with a conveying means for conveying the upper jig which supports the vehicle body components, and reduces the load applied to the lower jig from the upper jig when connecting the upper jig to the lower jig.

3 Claims, 1 Drawing Sheet

*Fig.1*
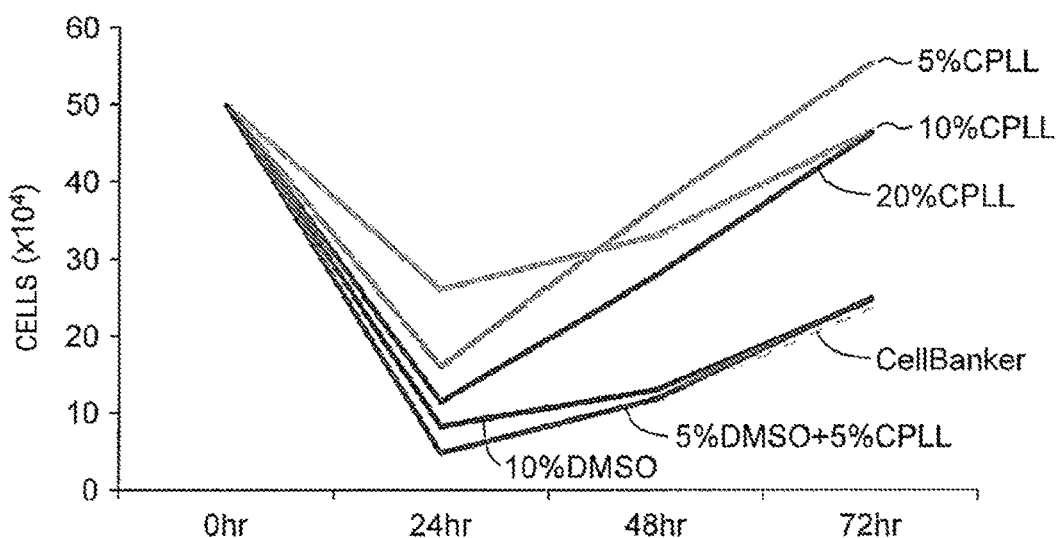
*Fig.3*
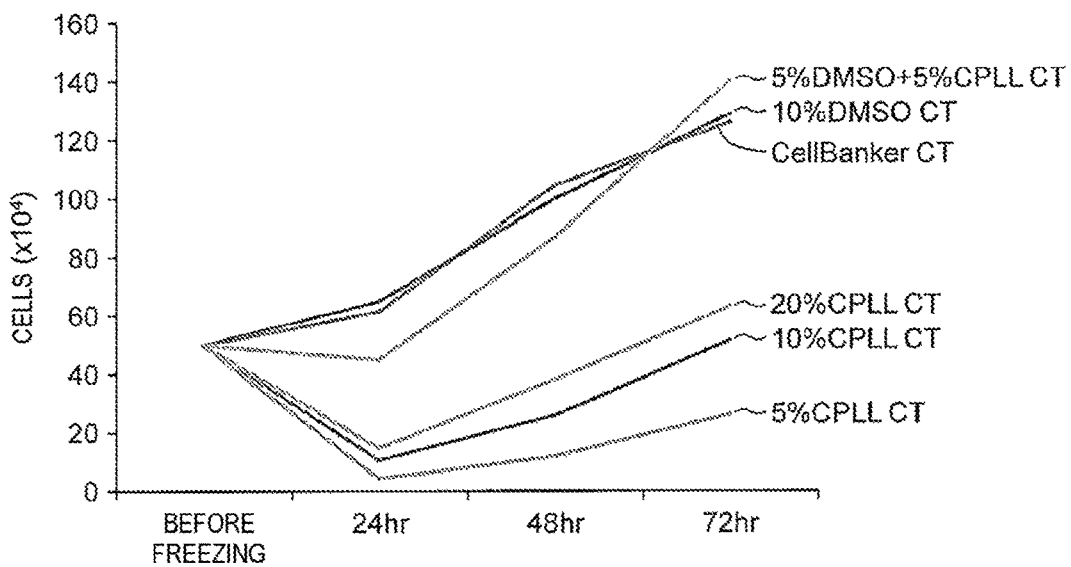

COMPOSITION FOR CRYOPRESERVATION OF BOVINE REPRODUCTIVE CELLS AND CRYOPRESERVATION METHOD THEREOF

TECHNICAL FIELD

The present invention relates to a composition for cryopreservation useful for cryopreservation of, for example, bovine reproductive cells and a cryopreservation method thereof.

BACKGROUND ART

A cryopreservation method at a temperature of 0° C. or lower is routinely used to preserve animal cells or tissues for a long period of time. However, animal cells or tissues contain water. It is well-known that, when freezing proceeds, water molecules crystallize with one another while excluding solutes and/or media of mixed-in substances and form ice crystals consisting of water molecules alone. Therefore, solutes and/or media of mixed-in substances unevenly diffuse in the water containing body, and freeze concentration develops.

In order to prevent such freeze concentration, methods involving addition of various low molecular weight compounds are performed. For example, when cryopreservation of cells is performed, a method is performed where low molecular weight dimethyl sulfoxide, glycerol or the like is added as a cryopreservation agent in order to minimize damage to the cells due to intracellular crystallization developed during cryopreservation.

In particular, in order to improve productivity of bovine calves as young livestock, it is important to develop a cryopreservation method useful for bovine reproductive cells.

For example, glycerol is known as a cryopreservative used for freezing bovine sperms. Moreover, glycerol, ethylene glycol, propanediol are known as cryopreservative used for freezing bovine ova and embryos. Further, dimethyl sulfoxide is known as a cryopreservative used for freezing bovine somatic cells.

However, all of these conventional cryopreservatives have problems such as high cytotoxicity.

In the meantime, incidentally, PCT/JP2009/002941 (JP5726525B) discloses a cryopreservation liquid containing an amphoteric polyelectrolyte having an amino group and a carboxyl group in the side chains. However, it has not been known that the cryopreservation liquid could be used for cryopreservation of bovine cells such as reproductive cells and somatic cells.

SUMMARY OF THE INVENTION

Problem to be Solved by the Invention

As mentioned above, in order to improve productivity of bovine calves as young livestock, it is important to develop novel cryopreservatives and cryopreservation methods useful for bovine reproductive cells. However, each of the conventional cryopreservatives used for freezing bovine cells has problems such as high cytotoxicity.

Thus, in light of these circumstances, the present invention intends to provide a cryopreservation composition and a cryopreservation method useful for freezing bovine cells including bovine reproductive cells.

Means to Solve the Problem

As a result of intensive studies to solve the problem mentioned above, the inventors of the present invention found that an amphoteric polyelectrolyte (antifreeze polyamino acid) obtained by reacting an amino group of ε-poly-L-lysine (PLL) with succinic anhydride and introducing an appropriate amount of a carboxyl group, alone or in combination with a conventional cryopreservative, is useful for cryopreservation of bovine reproductive cells or somatic cells, and thus completed the present invention.

Namely, the present invention encompasses the followings:

a composition for cryopreservation of bovine reproductive cells such as bovine sperms, comprising an amphoteric polyelectrolyte (antifreeze polyamino acid) comprising a unit represented by the following formula (I) and a unit represented by the following formula (II), wherein percentage of the unit represented by the following formula (II) is 50 to 99 mol %, and glycerol; and a cryopreservation method thereof.

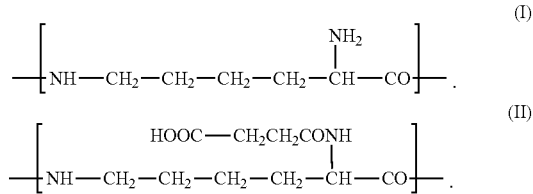

Advantageous Effects of Invention

According to the present invention, it is possible to provide a cryopreservation composition useful for bovine reproductive cells, and to improve productivity of bovine calves as young livestock. Moreover, according to the present invention, it is possible to provide a cryopreservation composition having low toxicity for bovine somatic cells.

BRIEF DESCRIPTION OF THE INVENTION

FIG. 1 is a view showing a manner of enclosing frozen embryos in a dedicated straw.

FIG. 2 is a graph showing the number (count) of adherent cells seeded after thawing the cryopreserved bovine somatic cells (bovine skin-derived fibroblast cells) (as seeded after removing the cryopreservative).

FIG. 3 is a graph showing the number (count) of adherent cells seeded after thawing the cryopreserved bovine somatic cells (bovine cumulus oophorus cells) (as seeded after removing the cryopreservative).

DESCRIPTION OF EMBODIMENTS

The composition for cryopreservation of bovine cells according to present invention comprises: ε-poly-L-lysine having a number average molecular weight of 1,000 to 20,000; 50 to 99 mol % of amino groups of which are blocked as carboxylated by having been reacted with the succinic anhydride (hereinafter referred to as "antifreeze polyamino acid")

Specifically, the antifreeze polyamino acid of the present invention is an amphoteric polyelectrolyte comprising (or consisting of) a unit represented by the following formula (I) and a unit represented by the following formula (II), where the percentage of the unit represented by the following formula (II) is 50 to 99 mol %.

<Chemical Formula I>

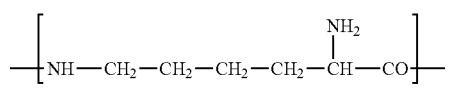

<Chemical Formula II>

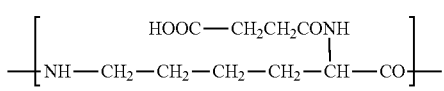

According to the cryopreservation composition for bovine cells according to present invention, the survival rate and proliferation of bovine reproductive cells or somatic cells after thawing the cryopreserved cells are able to be significantly improved. Moreover, according to the cryopreservation composition for bovine cells according to the present invention, the conception rate by artificial insemination or embryo transplantation are able to be significantly improved without impairing the developmental potency of bovine sperms or embryos after thawing the cryopreserved cells.

In present invention, mentionable (as adoptable) as the ε-poly-L-lysine is that (ε-poly-L-lysine) produced by microorganisms or enzymes, and having a number average molecular weight of 1,000 to 20,000, in particular of 1,000 to 10,000. Currently, such ε-poly-L-lysine is produced by actinomycetes belonging to the genus *Streptomyces* and is used solely as a food additive; and in addition to those having a polymerization degree of 15 to 35, those having a polymerization degree of 20 or less have been attempted to be produced (for example, JP2003-171463A and JP2005-318815A). The number average molecular weight or the number average polymerization degree are able to be easily measured by a SDS-PAGE (sodium dodecyl sulfate-polyacrylamide gel electrophoresis) method; for example, by using an electrophoresis device and a densitograph (AE-6920V type), which are manufactured by Atto Corporation. In such measuring, a standard protein marker is used. Meanwhile, also adoptable is ε-poly-L-lysine that is modified to have a high molecular weight of 30,000 or more, by increasing the molecular weight by heat treatment. However, in view of preventing viscosity increase and the like, the molecular weight range mentioned above is preferable.

By the reaction shown below, the amino groups of ε-poly-L-lysine are partially, blocked as carboxylated with succinic anhydride.

In the above, preferably 50 to 99 mol %, particularly 50 to 93 mol %, more preferably 50 to 90 mol %, still preferably 55 to 80 mol %, and most preferably 58 to 76 mol %, of the amino groups of ε-poly-L-lysine are carboxylated and blocked.

About 50 mol % of amino groups of ε-poly-L-lysine may be blocked by reacting 52 to 53 mol % of succinic anhydride with the amino groups. Moreover, when 100 mol % of succinic anhydride is subjected to such reaction, 90 to 95 mol % of amino groups are able to be blocked under ordinary reaction conditions. The cryopreservation effect decreases in either case when the blocking percentage exceeds or falls below above-mentioned range.

The cryopreservation composition for bovine cells according to present invention is an aqueous solution of the antifreeze polyamino acid as dissolved in a physiological aqueous solution. As for the physiological aqueous solution, adoptable is not only physiological saline but also a common culture solution for various cells or tissues. For example, Dulbecco's modified eagle's medium (DMEM) is mentionable as a preferable one.

In the first embodiment of present invention, the cryopreservation composition for bovine cells according to the present invention is: a composition for cryopreservation of bovine sperms, comprising above-described antifreeze polyamino acid and glycerol. The composition for cryopreservation of bovine sperms according to the present invention comprises, for example: the antifreeze polyamino acid in a concentration of 0.25 to 1.0 w/w %, preferably 0.3 to 0.9 w/w % or 0.3 to 0.8 w/w %; and glycerol in a concentration of 1.5 to 4.5 w/w % or 1.5 to 4.4 w/w %, and preferably 2.0 to 4.0 w/w %. Such content of the glycerol is an amount significantly reduced or halved from the amount conventionally used for cryopreservation of bovine sperms, and thus the composition for cryopreservation of bovine sperms according to the present invention is: a cryopreservative having low cytotoxicity.

According to the preferred cryopreservation method according to the first embodiment, the method comprises steps of: diluting bovine semen to 5 to 20 times, with a physiological solution added with the antifreeze polyamino acid and glycerol so that bovine sperms are suspended in a cryopreservation liquid comprising 0.3 to 0.9 w/w % of the amphoteric polyelectrolyte (the antifreeze polyamino acid) and 2 to 4 w/w % of glycerol as well as a portion derived from the bovine semen; freezing the cryopreservation liquid, in which the bovine sperms are suspended, in a tubular

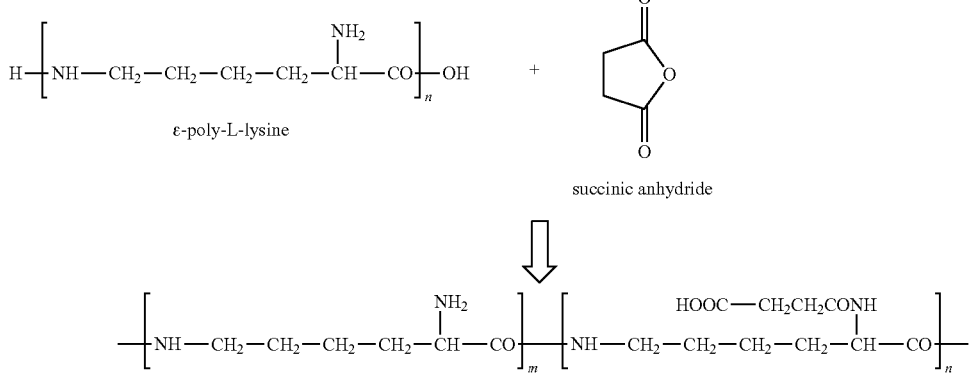

<Chemical Formula III> container; and then preserving them by keeping the cryopreservation liquid at −60° C. or lower temperature.

The diluting step preferably includes steps of: primary diluting, in which bovine semen is diluted to 2.5 to 10 times with a physiological solution and kept at 2 to 8° C.; and secondary diluting, in which the bovine semen is further diluted to the 5 to 20 times while being kept at 2 to 8° C., by adding dropwise a physiological solution containing the amphoteric polyelectrolyte (antifreeze polyamino acid) and glycerol, to a suspension obtained in the primary diluting step.

Moreover, preferably, cooling to −140° C. or lower temperature is made, using a cryopreservation straw with a diameter of 5 mm or less; by a slow freezing method at a cooling rate of 100° C./min or less with a program freezer or the like; or by a vitrifying and freezing method at a cooling rate of 300° C./min or more by liquid nitrogen immersion. Moreover, preferably, achievable is a motile sperm percentage of 30% or more and a high speed linear motion rate of 10% or more, at 6 hours after thawing the cryopreserved one.

As for the physiological solution, discretionarily adoptable as suitably is at least one among: an isotonic tris-citrate buffer solution (tris(hydroxymethyl aminomethane)); aqueous solutions of citric acid, glucose, sodium chloride and the like (including physiological saline); such solution further added with egg yolk, amino acid or the like; M199, CR1aa, Dulbecco's modified eagle's medium (DMEM), eagle's minimal essential medium (MEM) and the like. Such culture medium may contain, for example, 1000 mg/to 4500 mg/L of glucose or other monosaccharides, disaccharides, or the like.

Examples of a preferred physiological solution for preserving bovine sperms include those based on tris-citrate buffer solution prepared in a manner as follows. That is, in one specific example, 17.031 g of tris (hydroxymethyl aminomethane) (Wako Pure Chemical Industries), 9.519 g of citric acid monohydrate (Wako Pure Chemical Industries), 3.000 g of glucose (Wako Pure Chemical Industries), and 4.625 g of sodium chloride (Wako Pure Chemical Industries), as well as 3 ml of penicillin G potassium (Banyu Pharmaceutical Co., Ltd.) of 1,000,000 IU/4.6 ml SPUF, and 3 ml of streptomycin (Meiji Seiyaku Co., Ltd.) of 1,000 mg titer/4.3 ml SPUF are added with each other; and then, resulting solution is diluted up to 1,000 ml, with distilled water; so as to result in an aqueous solution containing 140.6 mM of tris (hydroxymethyl aminomethane), 45.3 mM of citric acid, 16.7 mM of glucose, and 79.1 mM of sodium chloride.

Another example of a preferred physiological solution for preserving bovine sperms is a tris-citrate buffer solution added with egg yolk (egg yolk tris sugar solution (ET)). This is a primary dilution liquid for semen, marketed by the Livestock Improvement Association of Japan, Inc. by the trade name of "Sort 90".

In a second embodiment of present invention, the cryopreservation composition for bovine cells according the present invention is a cryopreservation composition for bovine embryos comprising: above-described antifreeze polyamino acid, ethylene glycol, propanediol and fetal bovine serum. Examples of the bovine embryos to be subjected to the cryopreservation include, for example, bovine embryos developed for 6 to 9 days (preferably 7 to 8 days) by in-vitro fertilization (IVF) or the like.

The cryopreservation composition for bovine embryos according to present invention comprises: the antifreeze polyamino acid in a concentration of, for example, 5 to 10 w/w % (preferably 7 w/w %); ethylene glycol in a concentration of 4 to 6 w/w %, for example, 5 w/w %; propanediol (1,3-propanediol; propylene glycol) in a concentration of 4 to 8 w/w %, for example 6 w/w %; and fetal bovine serum in a concentration of 15 to 25 w/w %, preferably 20 w/w %.

In the third embodiment of present invention, the cryopreservation composition for bovine cells according to present invention is: a cryopreservation composition for bovine somatic cells comprising above-described antifreeze polyamino acid and the fetal bovine serum. Examples of the bovine somatic cells to be subjected to the cryopreservation include, for example: fibroblast cells, cumulus oophorus cells, mesenchymal cells, mesenchymal stem cell derived from human bone marrow, stem cells derived from adipose and the like.

The cryopreservation composition for bovine somatic cells according to present invention comprises, for example: the antifreeze polyamino acid in a concentration of 5 to 30 w/w % (preferably 5 to 25 w/w %); and fetal bovine serum in a concentration of 65 to 85 w/w % (preferably 70 to 80 w/w %).

Furthermore, the cryopreservation composition for bovine somatic cells according to present invention may contain dimethyl sulfoxide. The cryopreservation composition for bovine somatic cells according to present invention may contain dimethyl sulfoxide in a concentration of, for example, 0.1 to 10 w/w % (preferably 4 to 6 w/w %, or 5 w/w %).

Various bovine cells are cryopreservable by being suspended in above-described cryopreservation composition for bovine cells according to present invention, and by being frozen in a freezer at a temperature of, for example, −20 to −100° C., preferably −60 to −90° C. or −70 to −90° C., particularly preferably around −80° C. Regarding bovine sperms, for example, 15 to 30 million (preferably 20 to 30 million) bovine sperms are suspended in 0.25 to 0.5 mL of a cryopreservation composition, and are subjected to freezing. Regarding bovine embryos, for example, 1 to 50 (preferably 1 to 2) bovine embryos are suspended in 0.01 to 0.25 mL (preferably 0.02 to 0.05 mL) of a cryopreservation composition, and are subjected to freezing. Regarding bovine somatic cells, for example, 0.5 to 2 million (preferably 0.5 to 1 million) bovine somatic cells are suspended in 0.2 to 2 mL (preferably 1 mL) of a cryopreservation composition, and are subjected to freezing.

When frozen bovine cells are to be used, thawing them to use them may be made in line with a general thawing method for thawing various bovine cells. Meanwhile, the antifreeze polyamino acid has low cytotoxicity, and does not have to be removed when thawed unlike dimethyl sulfoxide and the like.

Moreover, the cryopreservation composition for bovine cells according to present invention may also be provided as a kit for cryopreservation of bovine cells. The kit includes the cryopreservation composition and may further include, for example: a container to be used for cryopreservation, an instruction manual of the kit or the like.

EXAMPLES

Hereinafter, the present invention is described in more detail by way of using examples, but the technical scope of the present invention is not limited to these examples.

Example 1: Cryopreservation of Bovine Sperms Using Antifreeze Polyamino Acid

1-1. Preparation of Cryopreservation Solution

The antifreeze polyamino acid was prepared by adding 65% (by mol %) of succinic anhydride (manufactured by Wako Pure Chemical Industries) to a 25% aqueous solution of ε-poly-L-lysine (having a molecular weight of 4,000 and manufactured by JNC Corporation (Chisso Corporation)) so that 60 mol % of amino groups in the ε-poly-L-lysine molecules are carboxylated as blocked.

Next, thus prepared antifreeze polyamino acid (CPLL) solution (an aqueous solution of about 33 w/w %) and glycerol (Gly) were added to a Dulbecco's modified eagle's medium (DMEM, Gibco™ 11330-032, glucose amount: 3151 mg/L) so as to become predetermined percentages (glycerol V/V %, CPLL w/w %). In this occasion, the solution was neutralized with 1N of hydrochloric acid or a sodium hydroxide aqueous solution so that the pH falls in a range of 7.0 to 8.0.

1-2. Method for Cryopreservation of Bovine Sperms

Semen collected from a seed bull was tested for sperm count, motility and the like, then was diluted to about 5 times with a primary diluent (the Dulbecco's modified eagle's medium used in "1-1"). The diluted semen was allowed to stand at low temperature (4° C.) and was slowly cooled. At a stage where the temperature of the semen fell to about 4° C., it was diluted dropwise with the primary diluent to half of the final dilution amount. Then, while maintaining the temperature at around 4° C., the diluted semen was diluted dropwise with a secondary diluent containing the cryopreservative (the "cryopreservation solution" obtained in "1-1") to the final dilution amount, and was divided and injected into cryopreservation straws ("0.5 ml, slim type", diameter 4 mm×133 mm, manufactured by Fujihira Industry Co., Ltd.). The cryopreservation straws were allowed to stand for a while, and then were cooled and frozen, by a slow freezing method using a program freezer at a cooling rate of 100° C./min or less, to around −150° C.; and then was stored in liquid nitrogen. (Added amount of the cryopreservative in the secondary diluent: 13 v/v % of glycerol in the conventional type; and glycerol 6.5 v/v %+CPLL 1.0 w/v % in the novel type)

Thawing of the cryopreserved sperm suspension was carried out by immersing the cryopreservation straws in warm water at 30 to 38° C. for 15 seconds after taking out the straws from the liquid nitrogen.

1-3. Results and Discussions for Cryopreservation of Bovine Sperms

The results of viability of the cryopreserved bovine sperms after thawing are shown in TABLE 1 below.

TABLE 1

Viability of the cryopreserved bovine sperms after thawing

| | | Fresh (No freezing) | Freezing/After thawing | | | | | | |
|---|---|---|---|---|---|---|---|---|---|
| | | | Gly 6.5% | | | | | Gly 3.25% | |
| | | | CPLL (−) | CPLL 0.5% | CPLL 1.0% | CPLL 2.5% | CPLL 5.0% | CPLL 0.5% | CPLL 1.0% |
| Straight-line velocity (%) | A | 75.8 ± 6.3 | 69.7 ± 4.0 | 35.4 ± 17.4 | 21.1 ± 4.4 | 2.4 ± 2.4 | 0.1 ± 0.1 | 62.2 ± 1.8 | 47.2 ± 6.4 |
| | B | 22.9 ± 37. | 24.3 ± 2.5 | 20.7 ± 4.2 | 16.6 ± 6.8 | 7.8 ± 10.2 | 2.2 ± 1.0 | 26.3 ± 0.9 | 24.7 ± 3.9 |
| | C | 3.4 ± 1.7 | 4.8 ± 1.1 | 22.1 ± 8.9 | 30.8 ± 5.9 | 185 ± 15.1 | 19.6 ± 3.7 | 8.4 ± 1.6 | 15.2 ± 2.6 |
| | D | 0.9 ± 0.8 | 1.4 ± 0.7 | 21.8 ± 12.7 | 31.5 ± 12.2 | 71.2 ± 22.0 | 78.2 ± 4.6 | 3.0 ± 1.0 | 13.0 ± 5.7 |
| | Sperm viability | 99.1% | 98.8% | 78.2% | 68.6% | 28.8% | 18.7% | 96.9% | 87.0% |
| Straight-line velocity (μm/sec) | | 39.8 ± 4.0 | 36.7 ± 3.1 | 24.2 ± 6.2 | 18.4 ± 2.9 | 10.1 ± 5.8 | 4.9 ± 1.5 | 32.9 ± 0.9 | 27.5 ± 2.4 |
| Curvilinear velocity (μm/sec) | | 101.5 ± 10.8 | 98.8 ± 7.4 | 59.5 ± 16.2 | 45.4 ± 5.6 | 28.3 ± 15.5 | 19.1 ± 3.1 | 84.5 ± 2.9 | 72.6 ± 4.8 |
| Average path velocity (μm/sec) | | 58.7 ± 6.4 | 55.3 ± 4.5 | 33.1 ± 9.5 | 25.7 ± 3.4 | 16.7 ± 9.3 | 10.0 ± 3.3 | 46.8 ± 2.2 | 40.2 ± 2.4 |
| Linearity | | 0.4 ± 0.0 | 0.4 ± 0.0 | 0.4 ± 0.0 | 0.4 ± 0.0 | 0.4 ± 0.1 | 0.3 ± 0.0 | 0.4 ± 0.0 | 0.3 ± 0.0 |
| Straightness | | 0.7 ± 0.0 | 0.7 ± 0.0 | 0.6 ± 0.0 | 0.6 ± 0.1 | 0.6 ± 0.2 | 0.6 ± 0.0 | 0.7 ± 0.0 | 0.6 ± 0.0 |
| Amplitude of lateral head displacement (μm) | | 2.4 ± 0.3 | 2.6 ± 0.2 | 1.5 ± 0.4 | 1.2 ± 0.2 | 0.8 ± 0.4 | 0.6 ± 0.1 | 2.2 ± 0.1 | 1.9 ± 0.1 |
| Beat-cross frequency (Hz) | | 10.5 ± 1.2 | 10.0 ± 0.4 | 9.2 ± 0.7 | 8.9 ± 0.8 | 9.1 ± 2.0 | 8.4 ± 0.7 | 9.7 ± 0.5 | 8.0 ± 0.4 |

As shown in TABLE 1, it became clear that CPLL is able to be used for cryopreservation of bovine sperms. Moreover, by adding CPLL, the conventionally used Gly is able to be reduced (halved). This means a cryopreservation liquid with a new composition having low cytotoxicity.

The results of conception by artificial insemination with cryopreserved bovine sperms are shown in TABLE 2 below.

TABLE 2

Results of conception by artificial insemination with cryopreserved bovine sperms

| | Cryopreservative | | Results of conception by artificial insemination | | |
|---|---|---|---|---|---|
| | Gly (%) | CPLL (%) | Insemination count | Conception count | Conception rate |
| Conventional method | 6.5 | — | 34 | 23 | 67.6% |
| Novel method | 3.25 | 0.5 | 31 | 25 | 80.6% |

(P = 0.23)

As shown in TABLE 2, an advantageous conception rate was obtained by artificial insemination with frozen bovine sperms using CPLL. This means that the developmental potency was not impaired after thawing the cryopreserved bovine sperms.

1-4. Assessment of Viability (Motility) of Sperms 6 Hours after Thawing the Cryopreserved Bovine Sperms Purpose:

No difference was found in sperm viability immediately after thawing the cryopreserved bovine sperms (TABLE 1), while differences were recognized in the conception rate by artificial insemination (TABLE 2). Thus, causes of this were searched.

Method:

Each of the sperms frozen and thawed by the conventional method (6.5% of glycerol) or by the novel method (3.25% of glycerol+0.5% of CPLL) was incubated for 6 hours and then the motility of each sperm was examined. For assessing motility of bovine sperms, sperm motility parameters (motility rate (Mot), progressive motility rate (Prog), straight-line velocity (VSL), curvilinear velocity (VCL), average path velocity (VAP), amplitude of lateral head displacement (AHL), beat-cross frequency (BCF)) at 37° C. were measured using a sperm motility analyzer (CASA; SMAS 3, manufactured by Detect Ltd.) and a measuring chamber (MICROCELL™ manufactured by Vitrolife). A sperm with VAP>10 μm/sec was rated as a motility sperm while a sperm with VAP>50 μm/sec and STR>0.75 was rated as a progressing motility sperm.

Results:

The results are shown in TABLE 3 below.

1-5. Assessment of Cell Membrane of Sperm Heads after Thawing the Cryopreserved Bovine Sperms Purpose:

No difference was found in sperm viability immediately after thawing the cryopreserved bovine sperms (TABLE 1), while differences were recognized in the viability of sperms after 6 hours of thawing (TABLE 3). Thus, causes of this were searched.

Method: Each of the sperms frozen and thawed by the conventional method (6.5% of glycerol) or by the novel method (3.25% of glycerol+0.5% of CPLL) was subjected to staining with SYBR® 14 (a fluorescent nucleic acid stain) and propidium iodide (PI) so as to examine disorders in cell membrane of sperm heads.

The cell membrane having no disorders is stained in green by SYBR® 14 while the cell membrane having disorders is stained in red by propidium iodide.

Results:

The results are shown in TABLE 4 below.

TABLE 4

| Cryopreserved Media | Plasma membrane integrity (%) |
|---|---|
| 6.5% Gly (Control) | 22.11 [a] |
| 3.25% Gly + 0.5% CPLL | 30.98 [b] |

(Significant difference between those with different signs: $P < 0.01$)

TABLE 3

| Medium | Mot (%) | Prog (%) | VAP (μm/s) | VSL (μm/s) | VCL (μm/s) | AHL (μm) | BCL (Hz) |
|---|---|---|---|---|---|---|---|
| 6.5% Gly (Control) | 23.70 ± 6.29 a | 3.49 ± 0.67 A | 16.01 ± 1.47 A | 5.50 ± 1.18 | 23.76 ± 2.91 | 0.53 ± 0.06 | 7.79 ± 0.49 A |
| 3.25% Gly + 0.5% CPLL | 38.50 ± 3.28 b | 11.97 ± 3.28 B | 19.81 ± 1.31 B | 5.23 ± 0.53 | 23.83 ± 2.03 | 0.46 ± 0.06 | 9.23 ± 0.46 B |

(Significant difference between those with different signs: A/B $P < 0.05$, a/b $P < 0.01$)

*Mot: motility rate, Prog: rapid progressive motility rate,

VAP: Average value of velocity in progressive traveling of sperms

VSL: Average value of traveling velocity along points on straight-line of sperms, VCL: Average value of traveling velocity along points on a curved line of sperms AHL: Average amplitude of lateral head displacement of sperms, and BCL: Beat count (per second) of heads of sperms As shown in TABLE 3, viability (motility) of sperms 6 hours after thawing was significantly better in the novel method than in the conventional method.

Discussion:

No difference was found in the viability (motility) of sperms immediately after thawing, while differences were recognized in the viability of sperms when a certain period of time elapsed after thawing.

It takes about 4 hours for sperms, which have been injected into the uterine cervical canal or the corpus uteri in artificial insemination, to reach the ampulla of the uterine tube where fertilization takes place. It is thus suggested that, when a certain period of time has elapsed after the thawing, the differences in viability of sperms possibly affects the conception rate.

As shown in TABLE 4, the percentage of cell membrane of sperm heads having no disorders after the thawing was significantly higher in the novel method than in the conventional method.

Discussion:

One of the causes of the recognized differences in viability of sperms 6 hours after the thawing is presumed to be damages by the thawing as inflicted on the cell membrane of the sperms.

Example 2: Cryopreservation of Bovine Embryos Using Antifreeze Polyamino Acid 2-1. Preparation of Cryopreservation Solution The antifreeze polyamino acid was prepared by adding 65% (by mol %) of succinic anhydride (manufactured by Wako Pure Chemical Industries) to a 25% aqueous solution of ε-poly-L-lysine (having a molecular weight of 4,000 and manufactured by JNC Corporation) so that 60 mol % of amino groups in the ε-poly-L-lysine molecules are carboxylated as blocked.

Next, thus prepared antifreeze polyamino acid solution (CPLL), ethylene glycol (EG), propanediol (PD) and fetal bovine serum (FCS or CS) were added to phosphate buffered saline (PBS, manufactured by Gibco) so as to become predetermined percentages (w/w %). In this occasion, the solution was neutralized with 1N of hydrochloric acid or a sodium hydroxide aqueous solution so that the pH falls in a range of 7.0 to 7.5.

2-2. Method for Cryopreservation of Bovine Embryos

Bovine embryos grown from morula to blastocyst stage embryos were washed with PBS having been added with 20% bovine fetal serum, and then immersed in the cryopreservation liquid having the CPLL, and was immediately enclosed in a 0.25 ml cryopreservation straw(s) (manufactured by IMV), along with the cryopreservation liquid (FIG. 1). After enclosing, equilibration treatment was carried out for 10 minutes to 20 minutes, and then, freezing was performed as follows: the bovine embryos in the cryopreservation straw(s) were cooled at a cooling rate of 100° C./min or less by a slow freezing method with a program freezer, to −30° C.; and then immersed in liquid nitrogen. After freezing, the bovine embryos in the cryopreservation straw(s) were stored in liquid nitrogen until it was used.

Thawing of the cryopreserved embryos was carried out as follows: the cryopreservation straw(s) was taken out from the liquid nitrogen and held in the air for 5 seconds; and then, immersed in warm water at 30 to 38° C. for 15 seconds 2-3. Results and Discussions of Cryopreservation of Bovine Embryos The results of viability of the cryopreserved bovine embryos after thawing are shown in TABLE 5 below.

TABLE 5

Viability after thawing of bovine embryos

| | | | | | Viability counts (%) | | | |
| | | | | Sample provision counts | Immediately after thawing (0 h) | Escape counts (%) | | |
| | EG(%) | PD(%) | CS(%) | CPLL (%) | | | 24 h | 48 h | −72 h |
|---|---|---|---|---|---|---|---|---|---|
| Control | 5 | 6 | 20 | — | 162 | 152(93.8)a | 113(69.8)a | 100(61.7)a | 22(13.6)a |
| Control + CPLL | 5 | 6 | 20 | 7 | 165 | 154(93.3)a | 106(64.2)a | 92(55.8)a | 14(8.5)b |
| EG + PG + CPLL (NO FCS) | 5 | 6 | — | 10 | 59 | 49(83.0)a | 29(49.2)a | 25(42.4)a | 0(0)b |
| EG + CPLL | 5 | — | 20 | 7 | 63 | 32(50.8)b | 13(20.6)b | 4(6.3)b | 0(0)b |
| PG + CPLL | — | 6 | 20 | 7 | 52 | 30(57.7)b | 10(19.2)b | 0(0)b | 0(0)b |
| CPLL | — | — | 20 | 7 | 60 | 10(16.7)c | 3(5.0)b | 1(1.7)b | 0(0)b |

\* Bovine embryos: Mr to EBL developed on the 7th to 8th day by IVF
(Significant difference between those with different signs: P < 0.05)

As shown in TABLE 5, it became clear that CPLL is able to be used for cryopreservation of bovine embryos, in the slow freezing method. Moreover, by adding CPLL to the conventional cryopreservative (concentration), viability that is not different from the conventional one was secured. This means a cryopreservation liquid with a new composition.

Results of embryo transplantation of cryopreserved bovine embryos are shown in TABLE 6 below.

TABLE 6

Results of embryo transplantation of frozen bovine embryos

| | Cryopreservative | | | Results of embryo transplantation | | |
| | EG (%) | PD (%) | CPLL (%) | Transplantation count | Conception count | Conception rate |
|---|---|---|---|---|---|---|
| Conventional method | 5 | 6 | — | 31 | 9 | 29% |
| Novel method | 5 | 6 | 7 | 50 | 25 | 50% |

(P = 0.06)

As shown in TABLE 6, an advantageous conception rate was obtained by embryo transplantation of frozen bovine embryos using CPLL. This means that the developmental potency after thawing the cryopreserved bovine embryos was not impaired.

The results of viability of the cryopreserved bovine embryos when exposed to the cryopreservation liquid after thawing are shown in TABLE 7 below.

TABLE 7

Viability of embryos when exposed to the cryopreservation liquid after thawing of bovine embryos

| | Exposure time | Sample provision counts | Viability counts (%) Immediately after thawing (0 h) | 24 h | Escape counts (%) 48 h | up to 72 h |
|---|---|---|---|---|---|---|
| Control + CPLL | 10 min | 116 | 96(82.8) | 30(25.9) | 18(15.5) | 2(1.7) |
| Control | | 102 | 88(86.3) | 20(29.4) | 17(16.7) | 0(0) |
| Control | 20 min | 121 | 93(76.9) | 21(17.4) | 6(5.0) | 1(0.83) |
| Control + CPLL | | 112 | 94(83.9) | 20(17.9) | 8(7.1) | 1(0.89) |

Example 3: Cryopreservation of Bovine Somatic Cells Using Antifreeze Polyamino Acid 3-1. Preparation of Cryopreservation Solution The antifreeze polyamino acid was prepared by adding 65% (by mol %) of succinic anhydride (manufactured by Wako Pure Chemical Industries) to a 25% aqueous solution of ε-poly-L-lysine (having a molecular weight of 4,000 and manufactured by JNC Corporation) so that 60 mol % of amino groups in the ε-poly-L-lysine molecules are carboxylated as blocked.

Next, thus prepared antifreeze polyamino acid solution (CPLL), dimethyl sulfoxide (DMSO) and fetal bovine serum (CS) were added to a Dulbecco's modified eagle's medium (DMEM, manufactured by Sigma Aldrich) so as to become predetermined percentages (w/w %). In this occasion, the solution was neutralized with 1N of hydrochloric acid or a sodium hydroxide aqueous solution so that the pH falls in a range of 7.0 to 7.5.

3-2. Method for Cryopreservation of Bovine Somatic Cells

Bovine somatic cells cultured to a confluent stage with a tissue culture flask (dish) were recovered by a standard method such as PBS washing, enzyme treatment with trypsin and the like. The recovered bovine somatic cells were immersed in the cryopreservation liquid in a cryopreservation tube (for 1.0 ml, manufactured by Falcon), and were immediately placed in a −80° C. deep freezer, as frozen and stored (stored in liquid nitrogen when long-term preservation is made).

Thawing of the cryopreserved somatic cells was carried out as follows: the cryopreservation straw(s) was taken out from the liquid nitrogen and, then immediately immersed in warm water at 30 to 38° C. until ice crystals having a size of rice grain remain in the tube (straw). The cryopreservation liquid is removed by centrifugation by a standard method, and then, the somatic cells were seeded in a cell culture device. Meanwhile, when the present cryopreservation liquid was adopted, removal of the cryopreservation liquid after the thawing was not necessary, i.e., it was possible to seed the cells without the removal.

3-3. Results and Discussions of Cryopreservation of Bovine Somatic Cells

The results of viability of the cryopreserved bovine somatic cells (bovine skin-derived fibroblast cells) immediately after thawing are shown in TABLE 8 below. Moreover, the results of cell proliferation of the cryopreserved bovine somatic cells (bovine skin-derived fibroblast cells) after thawing are shown in TABLE 9 below. Further, counts of adherent cells of cryopreserved bovine somatic cells (bovine skin-derived fibroblast cells) seeded after thawing (as seeded after removing the cryopreservative) are shown in FIG. 2.

TABLE 8

Viability rate of somatic cells (bovine skin-derived fibroblast cells) immediately after thawing

| | DMSO(%) | CPLL(%) | CS(%) | Viability rate |
|---|---|---|---|---|
| 10% DMSO | 10 | — | 75 | 86.7 ± 2.4a |
| 5% DMSO + 5% CPLL | 5 | 5 | 75 | 90.6 ± 4.3ab |
| 5% CPLL | — | 5 | 75 | 96.5 ± 1.7b |
| 10% CPLL | — | 10 | 75 | 92.3 ± 0.31ab |
| 20% CPLL | — | 20 | 75 | 92.3 ± 5.0ab |
| Cell Banker | 5-20 | — | 80 or less | 86.9 ± 3.1a |

(Significant difference between those with different signs: $P < 0.05$)

TABLE 9

Cell proliferation (of bovine skin-derived fibroblast cells) after thawing

| | Centrifugal removal | Before freezing (×10⁴) | Viable (collected) cells (×10⁴) | | |
|---|---|---|---|---|---|
| | | | 24 h | 48 h | 72 h |
| Unfrozen (Control) | | 50 | | | 61.5 ± 6.1 |
| No cryopreservative | + | 50 | 4.8 ± 1.5 | | 29.8 ± 4.8 |
| | − | | | | 25.9 ± 6.9 |
| 10% DMSO | + | 50 | 33.3 ± 2.5 | 33.3 ± 6.9 | 49.7 ± 3.8 |
| | − | | 26.7 ± 8.2 | 45.0 ± 13.1 | 50.7 ± 17.7 |
| 5% DMSO + 5% CPLL | + | 50 | 32.5 ± 17.4 | 45.8 ± 2.4 | 61.0 ± 3.6 |
| | − | | 26.0 ± 3.5 | 45.0 ± 13.1 | 62.5 ± 5.7 |
| 5% CPLL | + | 50 | 17.3 ± 2.3 | 37.0 ± 5.7 | 55.6 ± 6.4 |
| | − | | 40.0 ± 5.7 | 107.0 ± 14.1 | 134.8 ± 14.5 |
| 10% CPLL | + | 50 | 37.8 ± 3.9 | 39.3 ± 3.3 | 56.5 ± 2.2 |
| | − | | 58.5 ± 0.5 | 66.0 ± 11.5 | 105.5 ± 23.5 |
| 20% CPLL | + | 50 | 33.0 ± 5.5 | 39.2 ± 5.7 | 103.7 ± 14.0 |
| | − | | 19.2 ± 1.3 | 46.2 ± 27.9 | 69.2 ± 4.5 |
| CellBanker | + | 50 | | | 54.0 |
| | − | | 32.2 ± 9.5 | 39.7 ± 15.6 | 44.7 ± 4.8 |

Centrifugal removal (+): Cryopreservative was removed by centrifugation after thawing, and cells were cultured (Medium exchange was not performed until cells were counted).

The results of viability of cryopreserved bovine somatic cells (bovine cumulus oophorus cells) immediately after thawing are shown in TABLE 10 below. Moreover, the results of cell proliferation of cryopreserved bovine somatic cells (bovine cumulus oophorus cells) after thawing are shown in TABLE 11 below. Further, counts of adherent cells seeded after thawing of cryopreserved bovine somatic cells (bovine cumulus oophorus cells) (as seeded after removing the cryopreservative) are shown in FIG. 3.

TABLE 10

Viability rate of cells (bovine cumulus oophorus cells) immediately after thawing

| | DMSO(%) | CPLL(%) | CS(%) | Viability rate |
|---|---|---|---|---|
| 10% DMSO | 10 | — | 75 | 93.7 ± 1.5 |
| 5% DMSO + 5% CPLL | 5 | 5 | 75 | 91.8 ± 1.0 |
| 5% CPLL | — | 5 | 75 | 89.2 ± 5.3 |
| 10% CPLL | — | 10 | 75 | 89.23 ± 3.8 |
| 20% CPLL | — | 20 | 75 | 95.3 ± 1.2 |
| 25% CPLL | — | 25 | 75 | 91.6 ± 2.7 |
| 30% CPLL | — | 30 | 75 | 90.2 ± 3.2 |
| Cell Banker | 5-20 | — | 80 or less | 93.5 ± 5.0 |

TABLE 11

Cell proliferation (of bovine cumulus oophorus cells) after thawing

| | Centrifugal removal | Before freezing (×10⁴) | Viable (collected) cells (×10⁴) | | |
|---|---|---|---|---|---|
| | | | 24 h | 48 h | 72 h |
| Unfrozen control | | 50 | 52.6 ± 4.0 | 68.8 ± 7.9 | 117.5 ± 25.1 |
| No cryopreservative | + | 50 | 1.0 ± 0.5 | 2.8 ± 1.1 | 4.7 ± 2.1 |
| | − | | 1.7 ± 0.8 | 8.6 ± 6.8 | 7.2 ± 3.3 |
| CellBanker | + | 50 | 61.7 ± 5.0 | 104.7 ± 12.9 | 126.3 ± 17.0 |
| | − | | 32.7 ± 5.8 | 31.7 ± 4.5 | 41.8 ± 5.2 |
| 10% DMSO | + | 50 | 65.2 ± 4.6 | 100.3 ± 17.6 | 129.2 ± 6.0 |
| | − | | 38.7 ± 2.9 | 41.8 ± 2.1 | 50.2 ± 4.8 |
| 5% DMSO + 5% CPLL | + | 50 | 45.2 ± 5.3 | 87.3 ± 8.7 | 140.7 ± 6.7 |
| | − | | 32.3 ± 5.3 | 55.0 ± 8.2 | 71.2 ± 4.6 |
| 5% CPLL | + | 50 | 4.2 ± 0.3 | 11.9 ± 4.0 | 26.5 ± 5.8 |
| | − | | 11.3 ± 3.4 | 14.0 ± 2.0 | 24.2 ± 10.8 |
| 10% CPLL | + | 50 | 10.6 ± 2.0 | 26.1 ± 10.1 | 51.8 ± 7.4 |
| | − | | 17.4 ± 2.0 | 19.7 ± 5.4 | 31.7 ± 3.2 |
| 20% CPLL | + | 50 | 14.8 ± 2.8 | 38.2 ± 5.9 | 63.2 ± 2.8 |
| | − | | 15.2 ± 1.0 | 28.9 ± 4.6 | 33.2 ± 5.6 |
| 25% CPLL | + | 50 | 32.5 ± 2.4 | 79.0 ± 5.6 | 128.7 ± 11.9 |
| | − | | 21.3 ± 0.9 | 33.6 ± 3.7 | 51.3 ± 8.0 |
| 30% CPLL | + | 50 | 21.6 ± 7.2 | 49.0 ± 3.1 | 79.0 ± 29.1 |
| | − | | 9.4 ± 1.9 | 13.1 ± 1.5 | 12.3 ± 4.5 |

Centrifugal removal (+): Cryopreservative was removed by centrifugation after thawing, and cells were cultured (Medium exchange was not performed until cell counts were carried out).

As shown in TABLEs 8 to 11, and FIGS. 2 to 3, it became clear that CPLL is able to be used for cryopreservation of bovine somatic cells.

As shown in TABLEs 8 and 9, and FIG. 2, in bovine skin-derived fibroblast cells, CPLL served as a substitute for DMSO as a cryopreservative, and cryopreservation was possible by using CPLL alone as a cryopreservative. Moreover, the proliferation ability after thawing was higher when CPLL was used than when DMSO was used. Further, CPLL did not need to be removed when thawing was made, and it was possible to seed cells without removing CPLL.

On the other hand, as shown in TABLEs 10 and 11, and FIG. 3, CPLL served as a substitute for DMSO as a cryopreservative in cumulus oophorus cells, and cryopreservation was possible by using CPLL alone as a cryopreservative. Moreover, in view of the proliferation ability after thawing, the optimum CPLL concentration of fibroblast cells (5% of CPLL) differs from that of cumulus oophorus cells (25% of CPLL).

What is claim is:

1. A cryopreservation liquid with bovine sperms suspended in the cryopreservation liquid, in which bovine semen comprising the bovine sperms is diluted from 5 to 20 times, in a frozen or not-frozen state, the cryopreservation liquid comprising:
    about 0.5 w/w % of an amphoteric polyelectrolyte that is antifreeze polyamino acid comprising a unit represented by formula (I) below and a unit represented by formula (II) below wherein percentage of the unit represented by the formula (II) is 50 to 99 mol %; and
    about 3.25 w/w % of glycerol

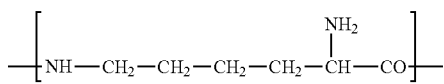

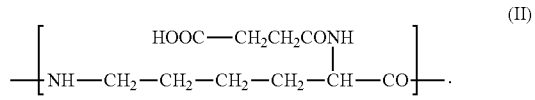

2. The cryopreservation liquid with bovine sperms according to claim 1, wherein
    the cryopreservation liquid is an aqueous solution of the antifreeze polyamino acid and glycerol as dissolved in a Dulbecco's modified eagle's medium (DMEM), eagle's minimal essential medium (MEM), other cell culture solution, or in other physiological solution; and
    the cryopreservation liquid is adjusted to have a pH in a range of 7.0 to 8.0 and comprises 5 to 20 w/w % of a liquid derived from bovine semen.

3. A cryopreservation liquid with bovine sperms suspended in the cryopreservation liquid, in which bovine semen comprising the bovine sperms is diluted from 5 to 20 times, in a frozen state, the cryopreservation liquid comprising:
    about 0.5 w/w % of an amphoteric polyelectrolyte that is antifreeze polyamino acid comprising a unit represented by formula (I) below and a unit represented by formula (II) below:

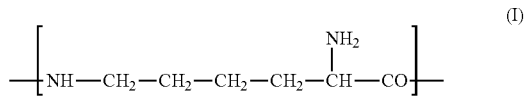

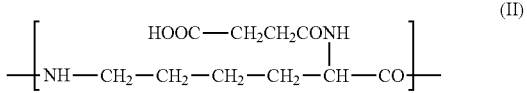

wherein percentage of the unit represented by the formula (II) is 50 to 99 mol %; and
about 3.25 w/w % of glycerol.

* * * * *